UNITED STATES PATENT OFFICE.

JOSEPH A. BRADBURN, EDWARD N. TRUMP, AND JOHN D. PENNOCK, OF SYRACUSE, NEW YORK.

PURIFYING BRINES, WATER, &c.

SPECIFICATION forming part of Letters Patent No. 413,432, dated October 22, 1889.

Application filed June 27, 1888. Serial No. 278,341. (No specimens.)

*To all whom it may concern:*

Be it known that we, JOSEPH A. BRADBURN, EDWARD N. TRUMP, and JOHN D. PENNOCK, (the said BRADBURN being a subject of the Queen of Great Britain and the others being citizens of the United States,) all being residents of Syracuse, county of Onondaga, in the State of New York, have jointly invented certain new and useful Improvements in Processes for Purifying Liquids, of which the following is a specification.

This invention relates to processes for purifying brines, water, and other liquids, whether natural or artificial, and to the removal, by precipitation or otherwise, of mineral impurities for the purpose of freeing the liquid from all scale-forming substances by the use of sulphide of barium and carbonic-acid ($CO_2$) gas.

The object of our invention is to accomplish the above result by a simple, inexpensive, and quick process which will render brine, water, or other liquids free from all calcic, magnesic, or iron impurities, so that they may be readily evaporated without forming scale, and so that the salt or soda made from the brine will be absolutely free from these impurities.

Our invention consists in the several novel features hereinafter described, and which are specifically set forth in the claims hereunto annexed.

The first step of our process consists in the commingling of sulphide of barium with the liquid to be purified, either directly or indirectly, by making a solution of the barium sulphide by dissolving it in water or brine and then adding this solution to the liquid to be purified.

The deleterious substances present in ordinary water or brine consist of the sulphates, carbonates, and chlorides of calcium, magnesium, and iron.

Where the liquid to be purified contains any sulphate of calcium ($CaSO_4$) and the sulphide of barium is added, a chemical combination between the barium and sulphuric acid takes place and the barium sulphate produced is precipitated in a very heavy granular form. A part remains in solution and part in suspension as a light precipitate. This chemical reaction is represented by the following equation: $2BaS + 2H_2O + 2CaSO_4 = 2BaSO_4 + CaH_2S_2 + CaH_2O_2$—that is, if barium sulphide is added to a solution of calcium sulphate, the result is calcium sulphydrate in solution and barium sulphate and calcium hydrate precipitated. When it is desired to preserve the sulphate of barium, we obtain it by decanting. The next step consists in forcing or otherwise passing carbonic-acid gas through or over liquid treated as above by the step or steps described, and by this the calcium or magnesium in solution as a hydrate or sulphydrate is precipitated as calcium or magnesium carbonate, ($CaCO_3$) or ($MgCO_3$,) and to prevent the formation of bicarbonate of calcium or magnesium we may heat the liquid when necessary. The union of calcium sulphydrate with carbonic-acid gas and water produces calcium carbonate precipitated with sulphureted-hydrogen gas liberated. The calcium carbonate so obtained by the introduction of carbonic-acid gas into the liquid is readily separated, and this constitutes the fourth step of the process, where the sulphate of barium is removed by decantation. The sulphate of barium, being very heavy, dense, and insoluble, is readily separated, and when so separated is comparatively free from lime, which, being so much lighter, practically remains in suspension.

If any chlorides of magnesium, calcium, or barium are present in the liquid, a soluble carbonate is added after the use of the carbonic-acid gas, and then the decantation removes the magnesium or calcium or barium, or all of them.

In case there is any iron in the solution in the liquid, the chemical effect of this process is that such iron is entirely precipitated and the liquid purified therefrom.

In case we desire to utilize the precipitated sulphate of barium, we regenerate it and convert it to the sulphide of barium (BaS) by any of the well-known processes, as by the mixing of the sulphate with twenty-five per cent. of small coal and twenty-five per cent. of salt and heating this mixture in a furnace or retort, and when removed therefrom the resulting mass contains the sulphide of barium, when it is lixiviated with either water or purified brine, and the solution of sulphide of barium thus obtained is ready for use, as above described, with fresh quantities of liquid to be purified, as in the first step of the process, wherein we produce by mixing and commingling the sulphate of barium, ($BaSO_4$.) It will thus be seen that by using barium sulphide, producing sulphate of barium from its union with the sulphate of calcium, and that by then heating the mixture of coal, salt, and barium sulphate and by the lixiviation, we preserve for use again all or nearly all of the barium sulphate, excepting the loss in regeneration. It will also be seen that the water or brine treated by this process is free from all sulphates and carbonates of calcium, magnesium, and iron, and that none of the barium used as a precipitant is left in solution. It will be further observed that the chemical reactions are simple and positive, while being perfectly effective, and that the extreme simplicity and effectiveness of the process recommend it for use upon a large scale, for the reason that the water so purified is freed absolutely from all scale-forming substances, and also that the brine so purified is of great advantage in the arts and is ready for use for evaporation to produce pure salt or in any of the soda processes. It will also be observed that where a soluble barium compound is used only a slight excess of this compound is necessary and that the $CO_2$ gas removes this light excess.

What we claim is—

1. The process for the purification of liquids consisting of the following steps, to wit: first, the commingling of sulphide of barium with the liquid; second, the passing of an excess of free carbonic-acid gas through the liquid; third, the decanting of the liquid so treated.

2. The process for the purification of liquid consisting of the following steps, to wit: first, the commingling of sulphide of barium with the liquid; second, the decanting of the liquid to recover the sulphide of barium; third, the passing of an excess of free carbonic-acid gas through the decanted liquid.

3. The process for the purification of liquids consisting of the following steps, to wit: first, the commingling of sulphide of barium with the liquid; second, the passing of an excess of free carbonic-acid gas through the liquid; third, the mixing of a soluble carbonate with the liquid to remove the calcium, magnesium, or barium present as chlorides.

4. The process for the purification of liquid consisting of the following steps, to wit: first, the commingling of sulphide of barium with the liquid; second, the decanting to recover the sulphate of barium; third, the passing of an excess of free carbonic-acid gas through the liquid; fourth, the mixing of a soluble carbonate with the liquid to remove the calcium and magnesium or barium present as chlorides.

In witness whereof we have hereunto set our hands this 25th day of June, 1888.

JOSEPH A. BRADBURN.
EDWD. N. TRUMP.
JOHN D. PENNOCK.

In presence of—
C. W. SMITH,
HOWARD P. DENISON.